United States Patent
Hansson (10) Patent No.: US 11,984,847 B2
(45) Date of Patent: May 14, 2024

(54) VENTILATED SOLAR PANEL ROOF

(71) Applicant: Raymond Solar AB, Mölnlycke (SE)

(72) Inventor: Mattias Hansson, Västra Frölunda (SE)

(73) Assignee: Raymond Solar AB, Mölnlycke (SE)

(*) Notice: Subject to any disclaimer, the term of this patent is extended or adjusted under 35 U.S.C. 154(b) by 103 days.

(21) Appl. No.: 17/776,778

(22) PCT Filed: Nov. 13, 2020

(86) PCT No.: PCT/SE2020/051092
§ 371 (c)(1),
(2) Date: May 13, 2022

(87) PCT Pub. No.: WO2021/096417
PCT Pub. Date: May 20, 2021

(65) Prior Publication Data
US 2022/0416719 A1  Dec. 29, 2022

(30) Foreign Application Priority Data

Nov. 14, 2019 (SE) .................................. 1951313-4

(51) Int. Cl.
*H02S 40/42* (2014.01)
*E04D 3/06* (2006.01)
(Continued)

(52) U.S. Cl.
CPC .............. *H02S 40/425* (2014.12); *E04D 3/06* (2013.01); *E04D 3/3605* (2013.01); *E04D 3/38* (2013.01);
(Continued)

(58) Field of Classification Search
CPC ........ H02S 20/23; H02S 40/32; H02S 40/425; H02S 50/00; E04D 3/06; E04D 3/3605;
(Continued)

(56) References Cited

U.S. PATENT DOCUMENTS

2008/0028704 A1  2/2008  Cooper et al.

FOREIGN PATENT DOCUMENTS

DE   102008064313 A1   7/2010
EP   2429002 A1        3/2012

OTHER PUBLICATIONS

PCT International Search Report and Written Opinion completed by the ISA/SE dated Dec. 11, 2020 and issued in connection with PCT/SE2020/051092.

(Continued)

*Primary Examiner* — Jessie T Fonseca
(74) *Attorney, Agent, or Firm* — Barnes & Thornburg LLP (57) ABSTRACT

A ventilated solar panel system mounted on a roof of a building (1), comprising a plurality of joists (12, 112) arranged substantially normal to an upper ridge (14) of the roof, and extending from the upper ridge (14) to a lower region of the roof, and a set of rectangular solar panels (2, 13), arranged on and supported by the joists (12, 112). The system further comprises a set of electrical fans (25), each fan (25) being arranged in the lower region of the roof and being aligned with one of the joists (12, 112), wherein each fan (25) is configured to create a flow of air towards the ridge (14), and wherein each joist (12, 112), in an end facing one of the fans (25), is formed with a dividing edge (32, 132) configured to divide the flow of air into two sub-flows (26a, 26b), a first sub-flow (26a), directed to a first side of the joist (12, 112), and a second sub-flow (26b) directed to a second side of the joist (12, 112), opposite to the first side.

15 Claims, 6 Drawing Sheets

(51) Int. Cl.
  *E04D 3/36* (2006.01)
  *E04D 3/38* (2006.01)
  *E04D 3/40* (2006.01)
  *E04D 13/17* (2006.01)
  *H02S 20/23* (2014.01)
  *H02S 40/32* (2014.01)
  *H02S 50/00* (2014.01)

(52) U.S. Cl.
  CPC ............... *E04D 3/40* (2013.01); *E04D 13/17* (2013.01); *E04D 13/174* (2013.01); *E04D 13/178* (2013.01); *H02S 20/23* (2014.12); *H02S 40/32* (2014.12); *H02S 50/00* (2013.01)

(58) Field of Classification Search
  CPC .. E04D 3/38; E04D 3/40; E04D 13/17; E04D 13/174; E04D 13/178
  See application file for complete search history.

(56) References Cited

OTHER PUBLICATIONS

Search Report completed by the Swedish Patent Office dated May 15, 2020 and issued in connection with Swedish Patent Application No. 1951313-4.

VENTILATED SOLAR PANEL ROOF

CROSS-REFERENCE TO RELATED APPLICATIONS

This application is a U.S. national counterpart application of International Application Serial No. PCT/SE2020/051092, filed Nov. 13, 2020, which claims priority to and the benefit of Swedish Patent Application No. 1951313-4, filed Nov. 14, 2019, the contents of each which is incorporated by reference herein in their entireties.

FIELD OF THE INVENTION

The present invention relates to a ventilated solar panel roof system. The invention is particularly (but not exclusively) useful for so called integrated solar panel roofs.

BACKGROUND OF THE INVENTION

With the increasing interest in solar energy, it has become increasingly popular to arrange solar panels on the roofs of houses, including private homes. By providing a private home with solar panels (rectangular elements covered by solar cells) on at least a portion of the roof surface, the home owner may generate electricity for personal use as well as for delivery onto the electrical grid. Some governments provide tax incentives for installing such solar panel installations, and also incentivize the delivery of solar power into the national grid.

In many cases, the solar panels are mounted on top of weather protecting surface of the existing roof. Such a weather protecting surface may be tar paper, sheet metal, or tiles. Such a "retrofit" installation of solar panels typically involves attaching suitable mounting brackets, onto which the solar panels are then mounted. The mounting brackets need to be attached without jeopardizing the weather protection of the roof. There is typically a separation between the original roof and the solar panels, enabling air to circulate and cool the underside of the panels.

In other cases, solar panels are installed when building a new house, or when replacing the roof (for example, roof tiles typically have a life span of about 30 years and then need to be replaced). For this purpose, there are commercially available solar panels which can serve not only as solar cells, but also as the weather protection of the roof. One example of such solar panels sold by Gruppsol AB, are shown at www.gruppsol.com. A roof construction where at least part of the weather protective outer layer is formed of solar panels is sometimes referred to as "integrated" solar panels. This is a potentially cost efficient approach, with one roof covering layer instead of two.

One challenge with solar cells in general is that the efficiency of available solar cells drops significantly at elevated temperatures. This is of course unfortunate, as the whole purpose of the solar cell is to be exposed of solar energy. For "retrofit" solar panels, the air gap under the solar panels provides some cooling, especially on a windy day. For integrated solar panels, however, there is typically no such air gap, and cooling needs to be provided by other means.

One approach, provided by Groupe Solution Energie, under the name GSE Air, is to provide suck hot air from underneath each solar panel, and provide this warm air to a heat exchanger. However, there is a need for a less complex and more cost-efficient solution for cooling solar panels, especially in the case of integrated solar panels.

General Disclosure of the Invention

According to a first aspect of the present invention, this object is achieved by a ventilated solar panel system mounted on a roof of a building, comprising a plurality of joists arranged substantially normal to an upper ridge of the roof, and extending from the upper ridge to a lower region of the roof, and a set of rectangular solar panels, arranged on and supported by the joists. The system further comprises a set of electrical fans, each fan being arranged in the lower region of the roof and being aligned with one of the joists, wherein each fan is configured to create a flow of air towards the ridge, and wherein each joist, in an end facing one of the fans, is formed with a dividing edge configured to divide the flow of air into two sub-flows, a first sub-flow directed to a first side of the joist, and a second sub-flow directed to a second side of the joist, opposite to the first side.

With this design, each compartment formed between two adjacent joists is exposed to two separate air streams, one along each adjacent joist. This ensures a satisfactory flow of air through under the entire under-side of the panels on the top of the compartment.

As an example, ventilation of a solar panel roof according to the present invention may provide an increase in efficiency of as much as 10%. This means that the power required to operate and control the fans can be significantly less than the power generation increase.

Each solar panel preferably comprises a solar cell array sandwiched between two sheets of glass, improving aesthetic appearance and providing a structurally strong surface. The glass is preferably temperated safety glass.

According to one embodiment, the joists are made of extruded metal profiles with hollow cross section, e.g. rectangular or square. The fans may then be at least partly inserted into the end of the joists and secured by suitable means. This provides a simple and cost efficient mounting of the fans, ensuring alignment with the joists.

In the case of hollow profile joist, the joists may, in a region adjacent the fan, be formed with two rectangular portions, each portions being cut out from a respective side of the joist, and being connected to the joist along a side distal to the fan. Each portion may further be around this distal side into the joist, such that sides of the two portions facing the fan meet to form a dividing edge inside the joist, which dividing edge is substantially normal to the roof and serves to divide the flow of air.

Alternatively, the joists are made of wood, and the dividing edge is formed by a tapered end of the wooden joist.

The roof may further comprise an elongated cover arranged along the ridge of the roof so as to cover an upper edge of solar panels on either side of the ridge. Further, at least one additional fan may be arranged in a space formed under this elongated cover, the fan being configured to promote an air flow out from this space. As the space under the cover is connected to the compartments formed between the joists, such an air flow out form this space will also promote the upwards air flow in the compartments.

The fans may be connected to a controller, configured to control operation of the fans based on information from at least one of 1) at least one temperature sensor arranged between the roof and the solar panels, 2) a power inverter connected to receive power from said solar panels, and 3) a weather forecast available via an internet connection. Such a controller will make it possible to optimize performance of the solar panels based on relevant parameters. By an internet connection, the controller may additionally be remotely controllable, e.g. via a smartphone or equivalent device.

The solar panel roof system may be formed outside a weather protecting outer cover of the roof, i.e. a "retro-fitted" solar panel system mounted on an existing roof construction, such as a tile roof.

Alternatively, however, the solar panel roof is an "integrated" solar panel roof, in itself forming a weather protecting outer cover of the roof. Such solar panel roofs are installed when building a new house, or when replacing an existing roof construction.

Each joist is preferably provided with a compressible sealing layer on an upper surface supporting the solar panels. Such a sealing layer ensures a more water tight boundary between solar panels and joists.

Further, adjacent solar panels may be separated by a gap along a central axis of a supporting joist, and the roof may further comprise a T-profile arranged on each joist, each T-profile having a central web positioned in the gap between two adjacent solar panels, and two flanges resting against a respective one of the adjacent solar panels. Such T-profiles ensure a secure fixation of the panels, both vertically and horizontally.

Further, each flange of the T-profiles may be provided with a compressible sealing layer, e.g. of the same kind provided in the joists, to make the roof even more water tight.

The compressible sealing layers may be made of a rubber material, e.g. EPDM.

The combination of double glass solar panels, t-profiles and compressible sealing layers provide a highly water tight integrated solar panel roof, new to the art. It is noted that this specific design of a solar panel roof is considered to represent a further, and separate, inventive concept, having advantages also when not combined with the first aspect of the invention above.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
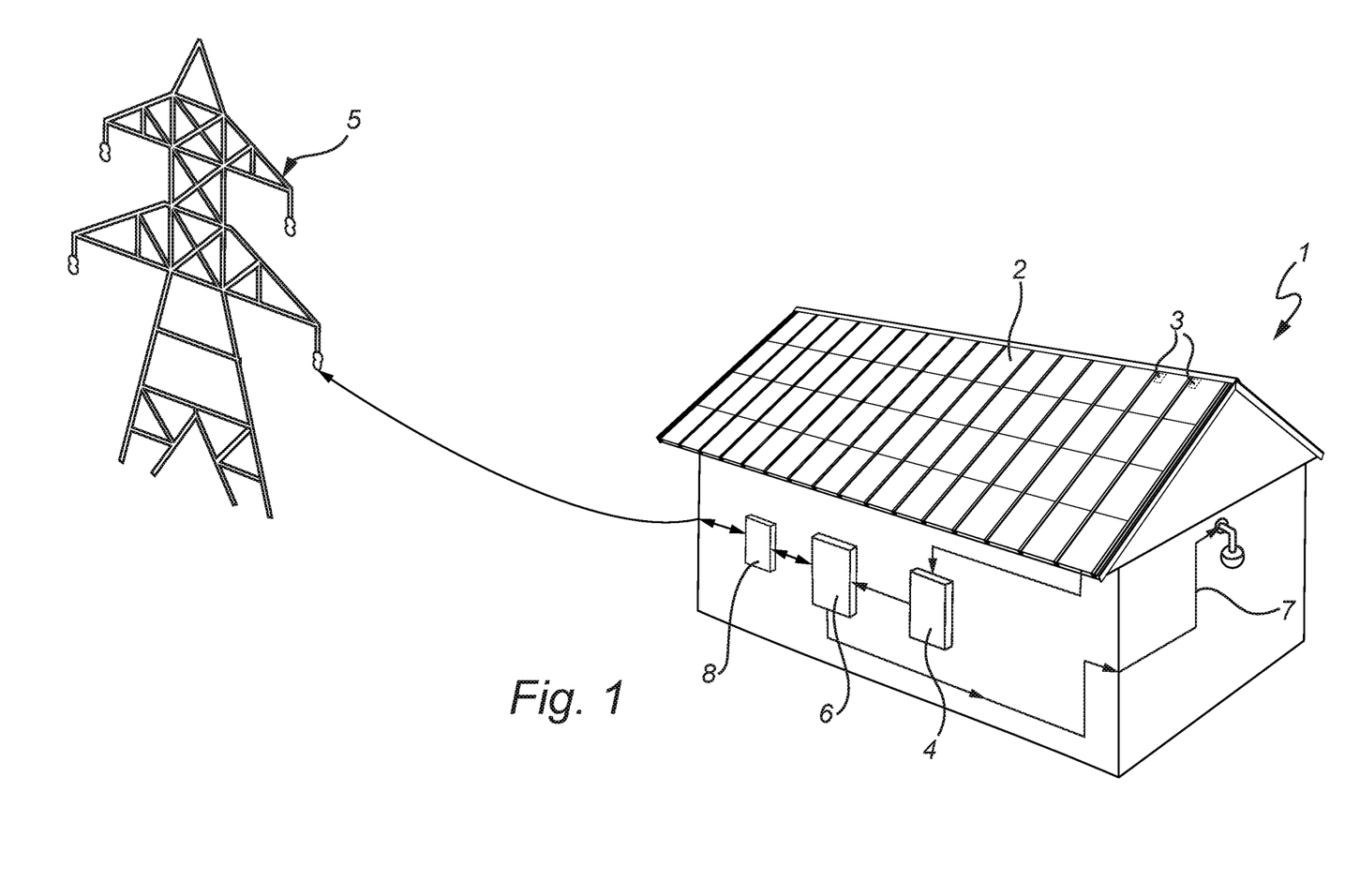
FIG. 1 shows schematically a house provided with a solar panel system.

FIG. 1 shows a house 1 provided with solar panels 2 including solar cells which generate electricity when exposed to sunlight. The solar cells are electrically connected to a power inverter 4 which is configured to convert the generated DC power to AC power compatible with the requirements of the local electrical power grid 5. The inverter 4 is connected to a main controller 6 which is also connected to the electrical system 7 of the house 1 and to the grid 5. The controller is configured to provide the electrical system of the house with electrical power from the solar panels 2 when such power is available, and otherwise to provide electrical power from the grid 5. The system also includes a monitoring/metering unit 8, which measures how much power from the solar cells 3 that is output to the grid 7, and also how much power that is drawn from the grid 5. Additionally, the inverter 4 may be connected to a high power battery device 9, in order to store electrical energy for future personal use instead of outputting in to the grid 5.

In FIG. 1, the inverter 4 is a single unit, in which case all solar panels are connected in series to the single inverter 4. Such a single inverter is sometimes referred to as a "string inverter". Each panel may be provided with a power optimizer 3, which, as the name implies, is configured to condition the generation of electrical power in the particular solar panel to optimally fit with the operation of the string inverter 4. The controller 6 is then connected to control each power optimizer 3.

Alternatively, each solar panel is provided with a separate inverter, sometimes referred to as a "microinverter". Although more expensive, this may be more efficient, especially if the panels are partly shaded, or mounted at different angles toward the sun.

Power optimizers and microinverters, i.e. power electronics arranged in association with each solar panel, are sometimes referred to as "module-level power electronics", or MLPE.

Figure 2A:
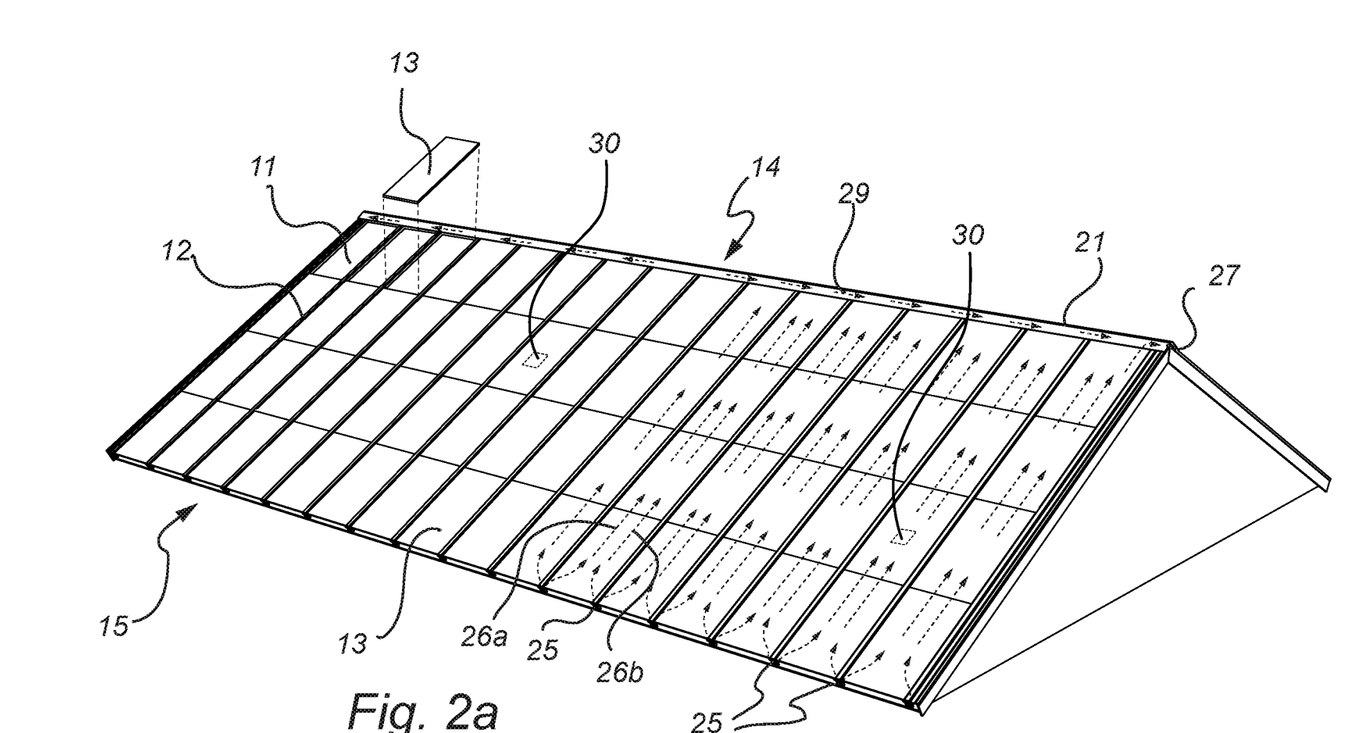
FIG. 2 shows an integrated solar panel roof according to an embodiment of the invention.
Figure 2B:
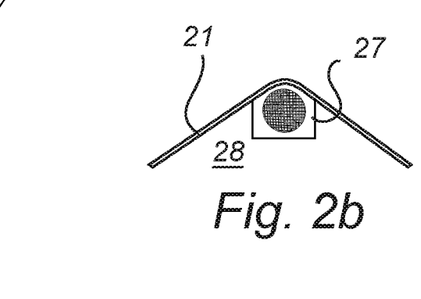
Figure 3A:
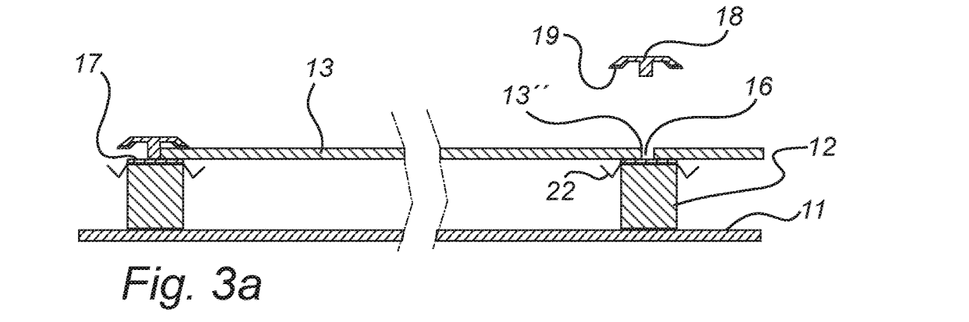
FIG. 3a shows a cross section of the roof in FIG. 2.
Figure 3B:
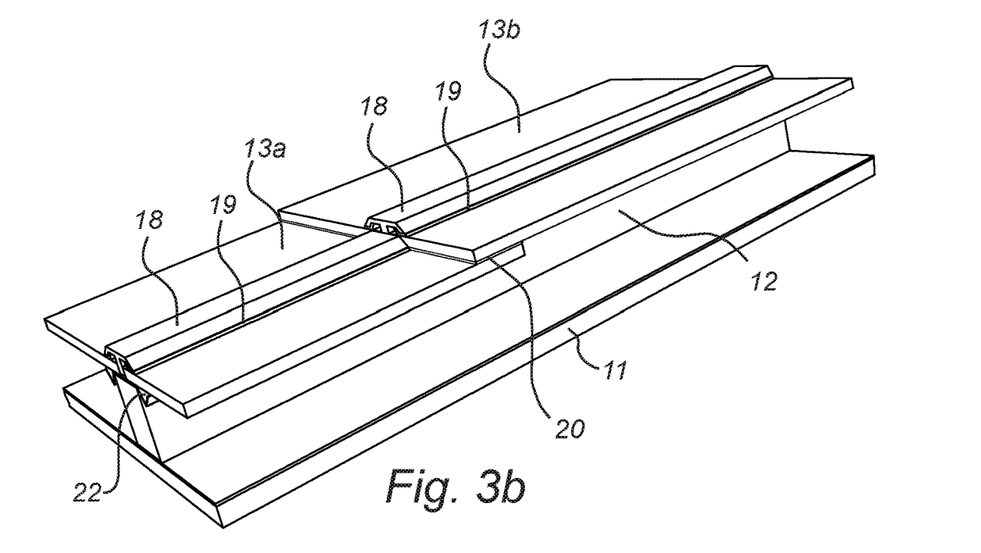
FIG. 3b is a perspective view of an overlap between a lower and an upper solar panel in FIG. 2.

FIGS. 2-3 show an integrated solar panel roof according to an embodiment of the invention. An integrated solar panel roof is here understood to provide a combined function of solar cells and outer protection (against weather, pressure, wear, etc.) of the roof. In other words, when installing an integrated solar panel roof, no regular roof tiling is required in areas where the solar panels are located. Such integrated solar panels are commercially available, e.g. from Gruppsol AB. In this case, each solar panel comprises a solar cell grid sandwiched between two glass panels. The glass is preferably temperated (safety) glass to provide a structurally strong surface. The panels may be 1 m by 1.65 m, but other dimensions are of course possible.

With reference to FIG. 2, the house 1 here has an underlying roof surface 11, e.g. tar paper on wood. On this surface is arranged a set of joists 12, onto which the solar panels 13 are arranged. In the illustrated case the solar panels cover substantially the entire roof, but it is equally possible to combine the integrated solar panels with conventional tiling.

Each joist 12 extends in the vertical direction of the roof, i.e. between the upper ridge 14 and the lower edge 15 of the side of the roof, and substantially normal to upper ridge 14. The joists 12 may be wooden or metal profile joists of standard dimensions, and may be mounted using conventional fastening means, such as screws, nails, etc.

The joists 12 are arranged at a center-to-center (cc) distance based on the width of the solar panels 13 that are to be mounted thereon. As shown more clearly in FIG. 3, the cc-distance is here slightly larger than the panel width, so as to leave a gap 16 between adjacent panels. The sides of the panel 13 rest on a compressible sealing layer 17 provided on the upper side of each joist 12. The sealing layer 17 may be made of a rubber material, e.g. EPDM. In addition to providing a water sealing, the sealing layer may also provide shock absorption protecting the panels.

With further reference to FIG. 3a, a T-profile 18 is here mounted in the gap 16 formed between two adjacent panels is mounted. The T-profile is arranged such that the web of the T extends down into the gap 16, and the flanges of the T presses against the sides 13a of the panels 13. The undersides of the flanges are preferably provided with the same type of compressible sealing layer 19 as the joists, e.g. EPDM. The T-profile is here slightly shorter than the height of a solar panel 13, as will be illustrated more clearly in FIG. 3b.

As shown in FIG. 2, the panels are mounted from the bottom, i.e. beginning with a row closest to the edge of the roof. The next row is then mounted above the first, with the lower edge of the second row panels slightly overlapping the upper edge of the first row panels. When the roof is covered by panels, a compartment is formed between each pair of adjacent joists, which compartment is delimited by the inner roof surface, the underside of the panels, and the sides of the joists. Above the top row of panels, i.e. along the ridge of the roof, is mounted an elongated ridge cover 21, e.g. formed of extruded metal (such as aluminum). This ridge cover serves to cover the upper openings of each compartment.

FIG. 3b shown in more detail how a second, upper solar panel 13b overlaps a first, lower panel 13a. The T-profile 18 securing the first solar panel 13a is slightly shorter than the panel 13a, such that an upper edge 13a' extends above the T-profile 18. This edge is preferably provided with a sealing layer 20, e.g. of rubber such as EPDM. The upper panel 13b rests upon the edge 13a', and also abuts against the upper end 18' of the T-profile 18.

In this way, the panels, the T-profiles and the ridge cover create a generally water tight outer cover of the roof. In order to handle any water that nevertheless penetrates the panels, each joist may be provided with longitudinal trenches 22 on each side immediately under the panels. As shown in FIG. 3, and even more clearly in FIG. 5, such trenches may be formed by an extruded metal (e.g. aluminum) element 23 attached on the upper side of the joist, which is here made of wood. The sealing layer is then attached on top of this extruded element. In case of an extruded metal (e.g. aluminum) joist, as shown in FIG. 7a-b, the trenches 122 may alternatively be formed integrally in the extruded joist 112.

Returning to FIG. 2, an electrical fan 25 is arranged below the lower end of each joist 13, and configured to direct a flow of air in an upwards direction, aligned with the longitudinal extension of the joist. The fan is preferably IP rated, and may have an electrical power in the order of 1 W, but more powerful fans are of course also possible. The end of the joist is further formed to divide the air stream into to sub-streams 26a, 26b, one on each side of the joist. As a result, each compartment formed between adjacent joists will receive two streams of air, forcing air from the lower edge of the roof towards the ridge. One or more additional fans 27 are further provided in a space 28 formed under the protective ridge cover 21. Such additional fans serve to create a flow of air 29 out from the space 28, thereby further promoting the ventilation of the compartments caused by the fans 25.

Figure 4:
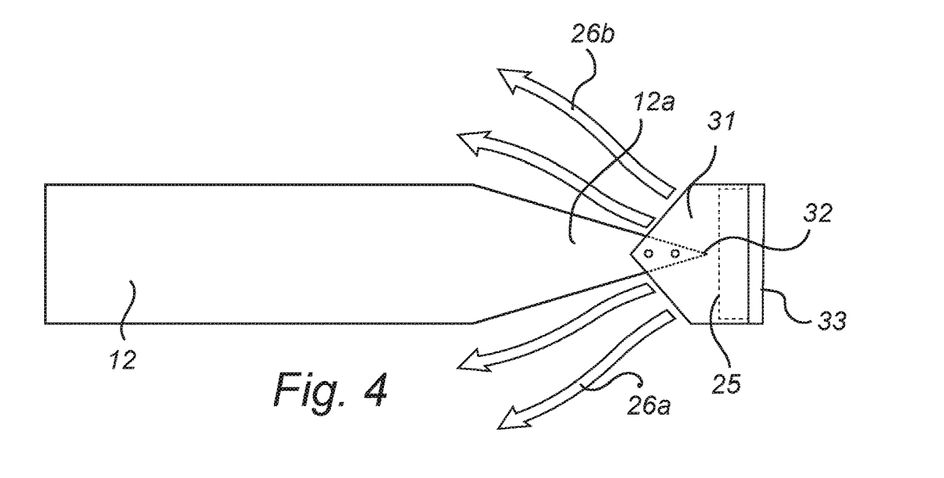
FIG. 4 is a top view of a fan attached to a wooden joist.
Figure 5:
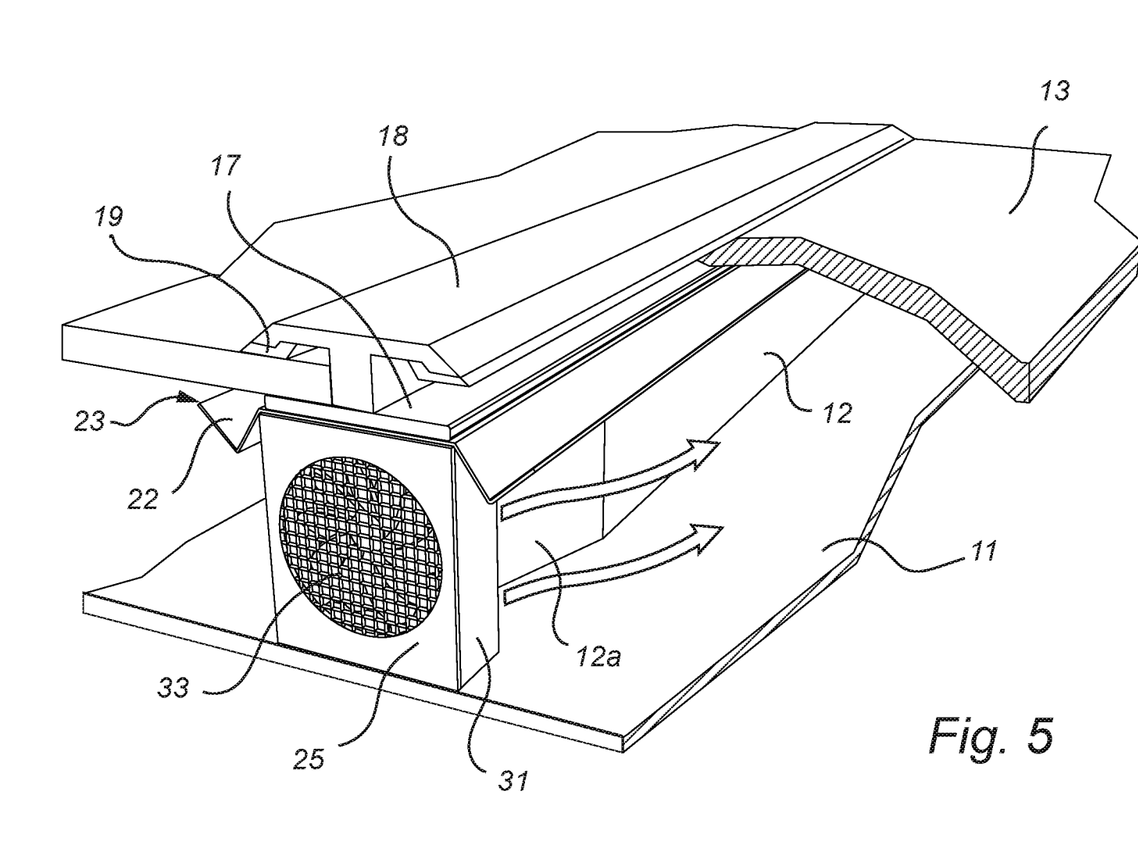
FIG. 5-6 are perspective views of a fan of the roof in FIG. 2.
Figure 6:
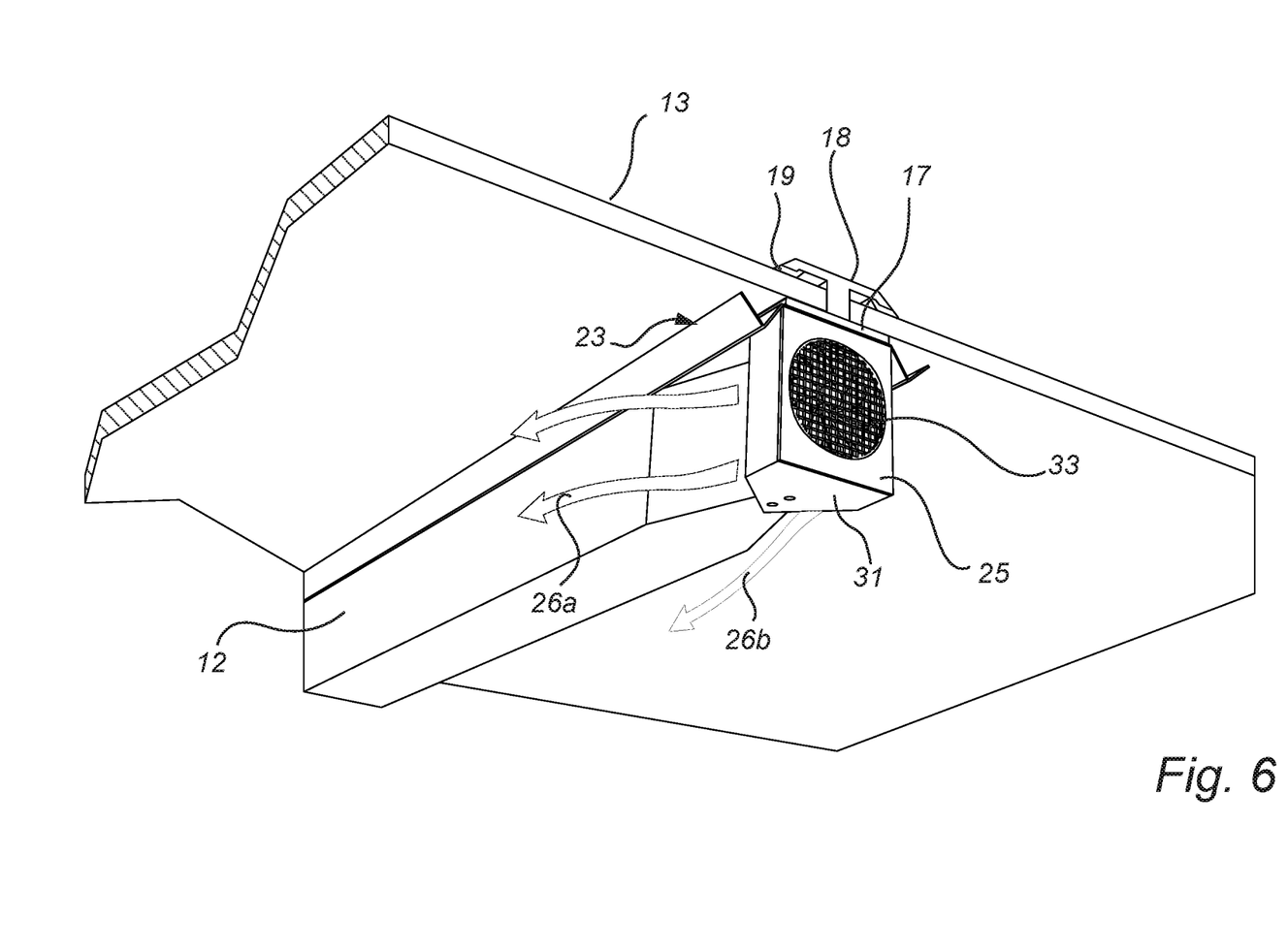

As shown in more detail in FIGS. 4-6, for the case of a wooden joist 12, the fan 25 may be held in place by a supporting device 31. The supporting device is here a metal (e.g. aluminum) sleeve, configured with one end to receive the fan 25, and another end to fit onto the joist 12. The supporting device 31 may be secured with screws, nails, etc. The wooden joist is further formed with a tapered end 12a, ending in a dividing edge 32 facing the fan. The dividing edge is normal to the roof. The air flow generated by the fan will hit the dividing edge 32 and be split into two streams 26a, 26b, one on either side of the joist. The fan may further be provided with a net 33 to prevent insects and debris to enter the fan.

Figures 7A, 7B:
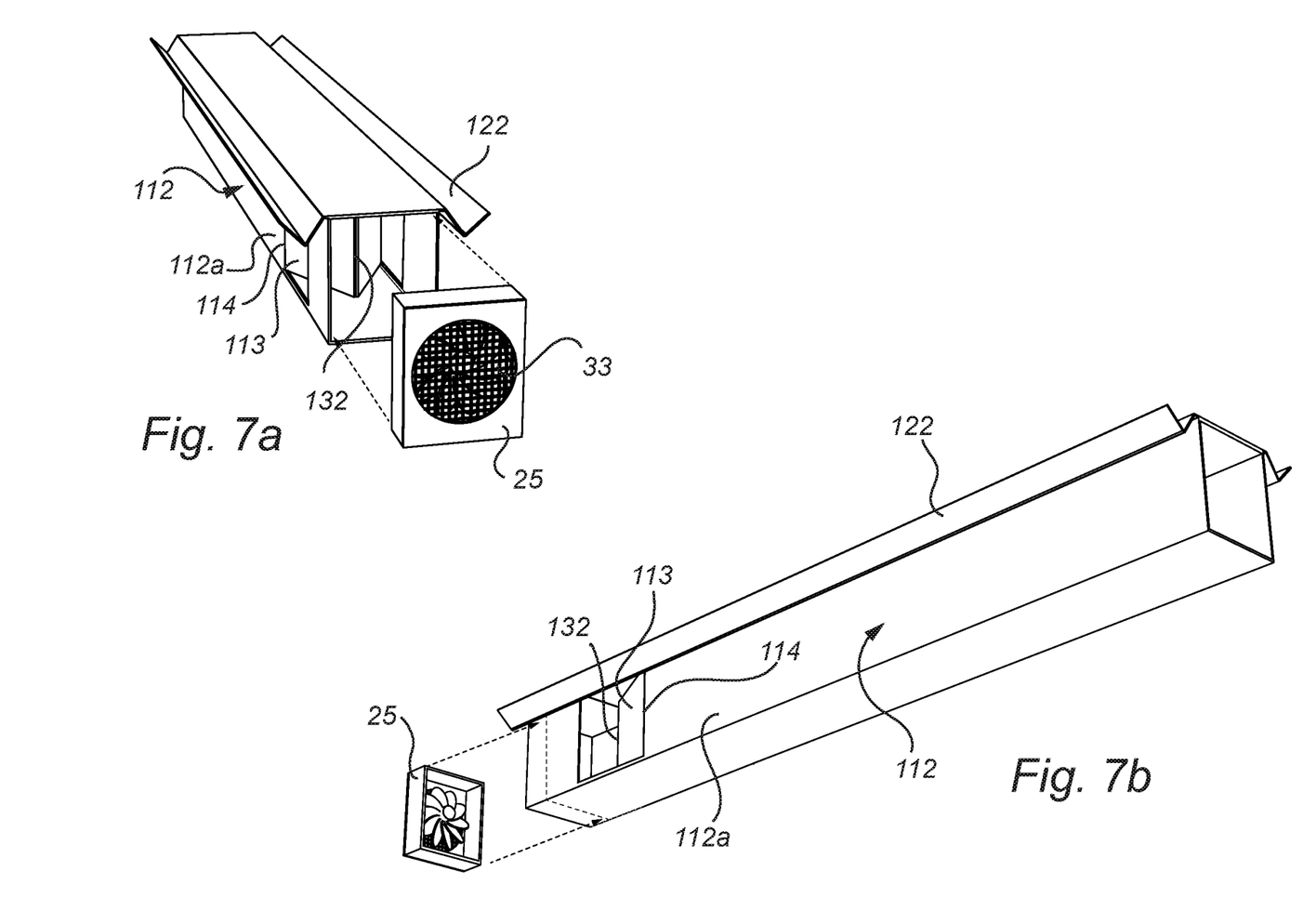
FIG. 7a-b are perspective views of a fan mounted in a hollow extruded metal joist.

FIGS. 7a-b show a fan 25 mounted in the end of a hollow profile extruded metal joist 112. The profile 112 here has a square cross section, but other cross sections, including rectangular, are also possible. In this case, the fan 25 may be at least partly inserted into and fixed in an end of the joist 112. In each side wall 112a of the joist is cut out a rectangular portion 113 which is still attached to the joist along the side 114 distant to the fan 25. The two portions 113 are bent into the joist, towards each other, until the sides facing the fan meet and form a dividing edge 132 facing the fan. Also in this case, the dividing edge 132 is normal to the roof, and the air stream generated by the fan will hit the dividing edge and be split into two streams 26a, 26b, one on either side of the joist.

The controller 6 (FIG. 1) is connected to control operation of the fans 25, 27 based on at least one temperature sensor 30 (FIG. 2) arranged between the underlying roof 11 and the solar panels 13. In a simple control scheme, the controller may be configured to start the fans 25, 27 when the temperature under the panels 13 reach a starting threshold, and to stop the fans 25, 27 when the temperature falls below a stopping threshold. Alternatively, or additionally, the controller 6 may control the fans 25, 27 based on the operation of the inverter 4. For example, a lower power output from the inverter 4 may trigger a start of the fans 25, 27. Further, in the case of power optimizers 3 connected to each panel 13, information from the optimizers 3 may also be used as input to the controller 6, triggering a start of the fans 25, 27 (or a start of selected fans) if one panel 13, or a set of panels 13, generate less power.

The controller 6 may further be connected to the Internet (e.g. through a Wi-Fi network installed in the house. This allows the controller to base control of the fans 25, 27 on weather forecasts available on-line. The fans 25, 27 may then e.g. be started in anticipation of warm weather.

An internet-connected controller 6 is also advantageous as it makes it possible to access the controller remotely, using e.g. an app on a smart phone. In this case, a user may access the controller 6 and all data available to the controller, and apply manual control of the fans 25, 27 based on this information. Such an app may also be configured to provide an indication to the user in the case of malfunction of a fan 25, 27. Preferably, the fans 25, 27 are designed so as to be easily replaceable by a home-owner without professional assistance. The electrical connection of the fans 25, 27 (to electrical power as well as to the controller 6) can be of "plug-and-play" type.

The person skilled in the art realizes that the present invention by no means is limited to the preferred embodiments described above. On the contrary, many modifications and variations are possible within the scope of the appended claims. For example, the solar panel roof system of the invention may also be mounted as a "retrofit" system, on top of an existing roof construction. The air streams formed between the joists will have a similar ventilating effect. Further, the solar panel roof described herein may be installed also directly on the beams of the roof, i.e. without the underlying roof 11, and where the joists 12 are formed by the beams of the roof. In this case, the sealing elements 17 are arranged directly on the beams, and the panels and T-profiles are then mounted in the same way as described above. Typically, the cc-distance of the beams will be slightly larger (e.g. 120 cm) which means that the width of the panels 13 should be correspondingly adjusted.

The invention claimed is:

1. A ventilated solar panel system mounted on a roof of a building, comprising:
   a plurality of joists arranged substantially normal to an upper ridge of the roof, and extending from said upper ridge to a lower region of the roof, and
   a set of rectangular solar panels, arranged on and supported by said joists,
   characterized by
   a set of electrical fans, each fan being arranged in said lower region of the roof and being aligned with one of said joists, wherein each fan is configured to create a flow of air towards said ridge, and
   wherein each joist, in an end facing one of said fans, is formed with a dividing edge configured to divide said flow of air into two sub-flows, a first sub-flow directed to a first side of said joist, and a second sub-flow directed to a second side of said joist, opposite to said first side.

2. The system according to claim 1, wherein each joist is an extruded metal joist with a hollow cross section, and each fan is received by and fixed in an end of one of the joists.

3. The system according to claim 2, wherein each joist, in a region adjacent said fan, is formed with two rectangular portions, each portions being cut out from a respective side of said joist, and still connected to the joist along a side distal to the fan, wherein each portion is bent around said distal side into the joist, such that sides of the two portions facing the fan meet to form a dividing edge inside the joist, said dividing edge being substantially normal to the roof and serving to divide said flow of air.

4. The system according to claim 1, wherein each joist is a wooden joist, and wherein an end of each joist facing a fan is tapered to form a dividing edge, said dividing edge being substantially normal to the roof and serving to divide sad flow of air.

5. The system according to claim 1, further comprising an elongated cover arranged along the ridge of the roof so as to cover an upper edge of solar panels on either side of the ridge, and at least one additional fan arranged in a space formed under said elongated cover, said fan being configured to promote an air flow out from said space.

6. The system according to claim 1, wherein the fans are connected to a controller, configured to control operation of the fans based on information from at least one of:
   at least one temperature sensor arranged between the roof and the solar panels,
   a power inverter connected to receive power from said solar panels, and
   a weather forecast available via an internet connection.

7. The system according to claim 1, wherein each joist, on an upper surface supporting the solar panels, is provided with a compressible sealing layer.

8. The system according to claim 1, wherein adjacent solar panels of the set of rectangular solar panels are separated by a gap along a central axis of a supporting one of the joist, and further comprising a T-profile arranged on each joist, each T-profile having a central web positioned in the gap between two of the adjacent solar panels, and two flanges resting against a respective one of the adjacent solar panels.

9. The system according to claim 8, wherein each flange is provided with a compressible sealing layer.

10. The system according to claim 9, wherein the compressible sealing layer is made of rubber material.

11. The system according to claim 1, wherein each solar panel comprises a solar cell array sandwiched between two sheets of glass.

12. The system according to claim 1, wherein each joist is provided with a trench on each side, such that any water penetrating between a corresponding one of the solar panels and the joist will be collected in a corresponding one of said trenches and guided down along the joist.

13. The system according to claim 1, wherein the system forms a weather protecting outer cover of said roof.

14. The system according to claim 1, wherein the system is formed outside a weather protecting outer cover of said roof.

15. The system according to claim 7, wherein the compressible sealing layer is made of rubber material.

* * * * *